UNITED STATES PATENT OFFICE.

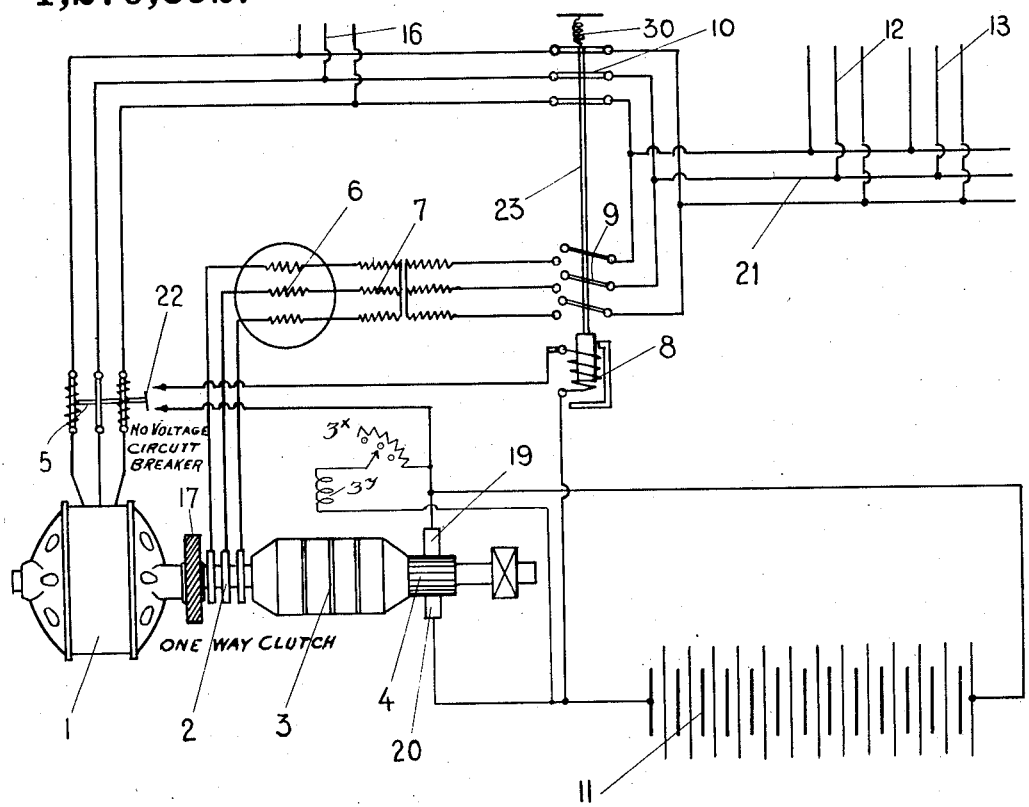

VITTORIO MARTINETTO, OF TURIN, ITALY.

ELECTRICAL DISTRIBUTING SYSTEM.

1,279,392.

Specification of Letters Patent. Patented Sept. 17, 1918.

Application filed January 4, 1916. Serial No. 70,215.

*To all whom it may concern:*

Be it known that I, VITTORIO MARTINETTO, electrician, of Turin, Italy, have invented certain new and useful Improvements in Electrical Distributing Systems, of which the following is a full, clear, and exact specification.

My invention relates to systems for the distribution of electric power in the form of alternating current. It is particularly adapted for use where power is transmitted through long feeders or produced by some delicate kind of machinery, the transmission being in said cases liable to frequent interruption. It provides a total or partial working reserve which is instantly available should a sudden failure in the transmission of the power from the main source take place.

The system essentially consists in the employment of a storage-battery formed by a limited number of elements (independent of the pressure supply) the power of which is at the proper time transformed into alternating current by means of a transformer of the usual type, the resulting pressure being raised by means of an induction regulator or step-up transformer. The frequency is regulated by suitably altering the excitation and consequently the speed of the converter. The system can be made entirely automatic by using the necessary automatic cut-outs and regulators.

The essential principle on which the present invention is based is that the converter for charging the battery shall be driven by means of a distinct electric motor.

The invention is illustrated by the annexed drawings, which show a diagram of the circuit connections.

The figure shows the application of the system as a total, instantaneously working reserve to a distributing network of three-phase alternating current. The converter is attached to a three-phase asynchronous induction motor by means of a special clutch joint which permits the motor to cause the rotation of the converter, but which will not permit the converter to drive the motor as a generator. The drawing illustrates a system in which the total failure of the main power lines brings a reserve supply into immediate connection with the main distributing lines.

With reference to the drawing, 1 shows a three-phase asynchronous motor joined at 17 to the converter 3 which is provided with the brushes 2 in sets of two, three, four, according to the kind of current (either monophase, threephase or biphase). The converter is provided on the continuous current side with the collector 4 on which bear the brushes 19 and 20 which collect and transmit the continuous current to the converter, the field winding $3^y$ and the rheostat $3^x$ being in shunt with the armature winding 3. To said brushes is attached the battery 11. Attached to the brushes 2 are the wires which connect the bars 21 to the converter through the induction regulator 6, the step-up transformer 7 and the circuit breaker 9 which is strongly attached to the interrupter 10 by means of the stem 23 thus preventing the contemporaneous closing and opening of both interrupters. The feeder 16 is connected to the motor through the no voltage circuit breaker or interrupter 5, said circuit breaker being provided with the auxiliary contacts 22 adapted to close the circuit of magnet 8 to automatically operate the interrupters 9 and 10. The feeder $16^t$ communicates with the bars 21 through the interrupter 10. From the bars 21 start the distributing lines 12, 13, etc.

The operation of the system is as follows:—

The attendant closes the circuit breaker 5 and sets the motor 1 fed by the line 16, in motion thus causing the converter 3 to rotate by means of the clutch joint 17. Assuming that the battery is charged, the converter will absorb only the energy which is necessary for exciting the induction regulator 6 and the transformer 7. If the battery is not charged the motor 1 will also supply energy for charging the battery. The interrupter 10 will be automatically closed by the tension spring 30, as the latter is no longer balanced by the effort of the magnet 8 which is deënergized following the closure of the circuit breaker 5. The feeder 16 will supply current to the bars 21 and consequently to the distributing circuits 12, 13, etc.

Should a sudden failure of the current take place in the feeder 16 the circuit breaker 5 will open automatically and close by means of the contact 22 the circuit exciting the magnet 8 which in turn will close the interrupter 9 and open the interrupter 10; the motor 1 will stop but the clutch joint 17 will permit the converter to continue its rotation. The converter will transform the continuous energy supplied to the battery into alternating current which by means of the brushes 2 and relative conductors will be carried to the induction regulator 6, regulated between given limits and then carried to the step-up transformer 7 which will transform same to the necessary pressure; then the interrupter 9 being closed as previously said, the energy supplied by the battery, duly transformed, will feed the bars 21.

The transformer 7 has been called a step-up transformer for the reason that the pressure of the battery, on account of both economical and technic considerations, will normally be lower than the voltage wanted in the distribution mains even if they are low-pressure lines.

I claim:—

1. In an alternating distributing system, a feed circuit, a distributing circuit normally connected with said feed circuit, an auxiliary source of alternating current and means actuated by the failure of the current in the feed circuit for disconnecting said feed circuit from said distributing circuit, and for connecting said auxiliary source of alternating current with said feed circuit, said auxiliary source of alternating current comprising a storage battery, a converter connected with the storage battery, connections between the converters and the distributing circuit and a motor for operating the converter, said motor having electrical connection with said feed circuit.

2. In an alternating current distributing system, a plurality of feed wires, a plurality of distributing wires normally connected with said feed wires, an auxiliary source of alternating current and means actuated by the failure of current in the feed wires for disconnecting said feed wires from said distributing wires and for connecting said auxiliary source of alternating current comprising a storage battery, a converter connected with the storage battery, connections between the converter and the distributing wires and a motor for operating the converter, said motor having electrical connection with said feed wires and means for preventing the operation of the motor by the converter.

3. In an alternating current distributing system, a plurality of feed wires, a plurality of distributing wires normally connected with said feed wires, an auxiliary source of alternating current and means actuated by the failure of current in the feed wires for disconnecting said feed wires from said distributing wires and for connecting said auxiliary source of alternating current with said feed wires, said auxiliary source of alternating current comprising a storage battery, a converter connected with the storage battery, connections between the converter and the distributing wires and a motor for operating the converter, said motor having electrical connection with said feed wires, and a one-way clutch for connecting said motor with said converter to drive the latter and to prevent the driving of the motor by the converter.

In witness whereof, I have hereunto signed my name in the presence of two subscribing witnesses.

VITTORIO MARTINETTO.

Witnesses:
 FELIN BAGETTO,
 C. S. PEYLES.